United States Patent [19]
Blake

[11] 3,865,770
[45] Feb. 11, 1975

[54] WATER-DISPERSIBLE PRESSURE-SENSITIVE ADHESIVE, TAPE MADE THEREWITH, AND NOVEL TACKIFIERS THEREFOR

[75] Inventor: Frederick D. Blake, St. Paul, Minn.

[73] Assignee: Minnesota Mining and Manufacturing Company, St. Paul, Minn.

[22] Filed: Dec. 1, 1972

[21] Appl. No.: 311,118

[52] U.S. Cl........ 260/27 R, 117/122 PA, 156/327, 156/338, 260/31.4 R, 260/97, 260/102
[51] Int. Cl............................ C09j 3/14, C09j 3/26
[58] Field of Search....... 260/27 R, 31.4 R, 97, 102; 117/122 PA; 156/327, 338

[56] References Cited
UNITED STATES PATENTS

| | | | |
|---|---|---|---|
| 2,710,856 | 6/1955 | Carpenter | 260/102 |
| 2,838,421 | 6/1958 | Sohl | 117/68.5 |
| 2,884,126 | 4/1959 | Ulrich | 117/68.5 |
| 2,982,750 | 5/1961 | Cyba et al. | 260/102 |
| 3,313,647 | 4/1967 | Weymann | 117/122 PA |
| 3,441,430 | 4/1969 | Peterson | 117/68.5 |
| 3,523,029 | 8/1970 | Searight et al. | 260/97 |
| 3,576,776 | 4/1971 | Muszik et al. | 117/122 PA |
| 3,661,874 | 5/1972 | Olson | 117/122 PA |

Primary Examiner—Ronald W. Griffin
Attorney, Agent, or Firm—Alexander, Sell, Steldt, & DeLaHunt

[57] ABSTRACT

Certain normally water-insoluble acrylate:vinyl carboxylic acid copolymers are at least partially neutralized with alkanolamines to make water-dispersible pressure-sensitive adhesives; generally a water-dispersible tackifier or plasticizer is also employed. Preferred tackifiers are novel tacky semi-solid reaction products of acid rosins and alkanolamines. When the adhesive is coated on one or both sides of water-dispersible sheet material, the product is useful as a repulpable splicing tape.

14 Claims, No Drawings

WATER-DISPERSIBLE PRESSURE-SENSITIVE ADHESIVE, TAPE MADE THEREWITH, AND NOVEL TACKIFIERS THEREFOR

BACKGROUND OF THE INVENTION

This invention relates to normally tacky and pressure-sensitive adhesives which are water-dispersible, to tapes made therewith, and to novel tackifiers for water-dispersible rubbery polymers.

Papermaking and printing operations require splicing the end of one roll of paper to the beginning of another, as well as splicing together a roll after defective material is cut out. It is important that such splices be made quickly and easily, necessitating the use of an adhesive which rapidly attains maximum strength and which retains that strength throughout subsequent operations. In an era where ecology is a vital concern, it is important that the spliced portions not be destroyed but that they be returned to the paper mill for reprocessing; it is thus essential that the splices (particularly the adhesive which is used to make it) be water-dispersible and repulpable. This combination of requirements precludes the use of conventional normally tacky and pressure-sensitive rubber-resin adhesives. In the past, several water-soluble pressure-sensitive adhesives have been devised and employed commercially, but none has been able to achieve the desired combination of physical properties and low cost.

An early adhesive used in splicing paper was polyacrylic acid, a water-soluble polymer which is rubbery in the presence of water but which becomes brittle and friable at low humidities. Sohl U.S. Pat. No. 2,838,421 discloses a splicing tape in which related rubbery polymer adhesives are blended with polypropylene glycol to impart flexibility, particularly in low humidity environments. Double-coated paper tapes made with such adhesives have been widely used in the papermaking and printing industry; although excellent in many respects, the tack and the release from the liner interleaved in the roll of tape or both adversely influenced by high ambient humidity.

Peterson U.S. Pat. No. 3,441,430 discloses a splicing tape product in which the pressure-sensitive adhesive is a water-soluble acrylic acid:ether acrylate copolymer tackified with a liquid water-soluble plasticizer containing at least one ether linkage. Because of the ether linkage, this adhesive is inherently sensitive to oxidation, and its performance characteristics are greatly influenced by conditions to which it has previously been subjected. For example, exposure to high temperature (either before or after use in splicing) tends to reduce tackiness, flexibility and repulpability. It is not always possible to protect the tape from such conditions.

Olson U.S. Pat. No. 3,661,874 discloses a water-soluble pressure-sensitive adhesive made by reacting an epoxidized rubbery polymer with a water-soluble secondary monoamine and tackifying the polymer with a water-soluble tackifier-plasticizer. When carefully formulated, this adhesive has outstanding physical characteristics, meeting all the requirements imposed by the papermaking industry, but the manufacturing process is complex and hence expensive.

SUMMARY OF THE INVENTION

The present invention provides normally tacky and pressure-sensitive adhesives which are water-dispersible or water-soluble, as were the prior art adhesives discussed in the preceding section. Adhesives of the invention display better tack and heat stability than the Peterson adhesive and they are easier to manufacture than the Olson adhesive. Adhesives of the invention can be coated on a removable liner and used as transfer tapes, i.e., the exposed surface of the adhesive adhered to a first substrate, the linear removed, and the newly exposed adhesive surface adhered to a second substrate. Splicing tapes made with these adhesives are areadily repulpable, and the adhesives can be formulated to provide excellent shear and "wet grab" properties. Despite the foregoing valuable properties, the adhesives are comparatively inexpensive.

In accordance with the invention, a sheet backing is provided, on at least one face, with a normally tacky and pressure-sensitive adhesive which is based on a rubbery copolymer of (a) one or more alkyl acrylates derived from a non-tertiary alkyl alcohol having a 1–14 carbon chain, the average preferably being about 4–12 carbon atoms, and (b) one or more vinyl carboxylic acid monomers at least partially neutralized with a secondary or tertiary alkanolamine containing 4–18 carbon atoms (optionally chain-extended with polyoxyethylene or polyoxypropylene), so as to make the otherwise water-insoluble rubbery copolymer water-dispersible. In making the copolymer, about 20–90 weight percent acrylate monomer and correspondingly, about 80–10 weight percent acid monomer are utilized. It is generally preferable to blend with 100 parts by weight of a copolymer up to 400 parts by weight of water-dispersible tack-promoting material such as a plasticizer or tackifier, although not all copolymers require this component. Where neither a plasticizer nor a tackifier is included in the adhesive formulation, the alkanolamine used to neutralize the acid portion of the copolymer is advantageously a dialkyl amine, especially dimethyl amine, which has been chain-extended with ethylene oxide or propylene oxide.

As previously indicated, alkanolamine used in the partial neutralization of the acid function of the copolymer should be secondary or tertiary. Although monoalkanolamines may be employed, di- and trialkanolamines are preferred; replacement of all of the available amino hydrogens with an alkyl or alkanol group eliminates the possibility of amide formation, which would reduce water-solubility and adversely affect aging of the adhesive product. It is generally preferred to utilize alkanolamines having a minimum number of carbon atoms so as to minimize difficulty in reaction due to steric hindrance. Thus, for example, it is greatly preferred to employ alkanolamines in which at least one, and preferably more, of the amine-hydrogen atoms are replaced with chains containing only one carbon atom. If it is desired to employ an alkanolamine containing a substantial number of carbon atoms, two lower alkyl or alkanol groups (e.g., methyl or ethanol) should be attached to the nitrogen atom.

Plasticizers and tacifiers achieve the same physical result in quite different ways. A plasticizer imparts tackiness by softening a firm polymer, i.e., by effectively lowering its glass transition temperature ($T_g$). A tackifier, on the other hand, brings about an increase in the $T_g$ of the polymer. Suitable water-dispersible plasticizers for use in the practice of the invention includes oily liquid substituted or unsubstituted polyoxyalkylene compounds, e.g., the polyoxyethylene adducts of alkyl-substituted phenols such as octyl or nonyl phenol. Especially preferred tackifiers are the novel neutral or mildly acidic reaction products of naturally occurring normally water-insoluble acid rosins (typically having an acid number in the range of 135–170, although resins having acid numbers outside this range may also be used) with secondary or tertiary alkanolamines, which are selected on the basis of the same desiderata previously discussed.

Speaking in general term, water-dispersibility is achieved when from about 3–22% by weight of the total copolymer consists of carboxyl groups which are subsequently neutralized, the requisite percentages being directly related to both the chain length and the percentage of the acrylate monomer employed in making the copolymer. It is not absolutely essential that all the acid function present in the copolymer be neutralized, provided that sufficient acid has been neutralized to impart water-dispersibility. The acid function may, of course, be neutralized beyond the point required for water-dispersibility, although it should be recognized that the resultant adhesive will thereby be rendered more sensitive to atmospheric moisture.

Test Procedures

It is believed that a brief explanation of certain test procedures, used to evaluate various characteristics of water-soluble pressure-sensitive adhesives and tapes made therewith, will be helpful in understanding the invention.

Rolling Ball Tack

In this test a 7/16-inch diameter steel ball is rolled down a plane having a length of 7 inches and inclined at an angle of 21°30′ to a horizontal surface on which is positioned, adhesive side up, the tape which is to be evaluated, the adhesive thickness being at least 1 mil. The distance the ball rolls along the horizontal adhesive surface is measured, the tack being inversely proportional to the distance. Further details of this test are found in Test Methods for Pressure-Sensitive Tapes, 6th Edition, Pressure-Sensitive Tape Council, Glenview, Ill. 60025, Test No. PSTC—6. Generally speaking, adhesives used in the practice of this invention should have a rolling ball tack value of no more than 20 inches and preferably less than 15 inches. Where tape is to be used in splicing rolls of paper together at speeds of perhaps 2,500 ft/minute (i.e., in making so-called flying splices), tack values on the order of 1–3 inches are greatly preferred. On the other hand, tape used in such applications as the sealing of oil cans does not require low rolling ball tack values.

Shear Adhesion

A 1-inch × 1-inch end portion of a 1-inch × 6-inch strip of tape, formed by coating a 1-mil or thicker layer of adhesive on 40-lb. supercalendered kraft paper backing, is adhered to a bright annealed steel test panel and rolled down with two passes of a 4½-lb. roller. The panel is then clamped in a jig which is disposed at 2° to the vertical, so that the 5-inch free end of the tape extends downward, at an angle of 178° to the test panel, and a 500-gram weight is attached to the tape end. The time for the tape to separate from the panel is reported in minutes, the shear strength being directly related to the elapsed time. Further details are found in the aforementioned Test Methods for Pressure-Sensitive Tapes, Test PSTC—7. It is desirable to have shear time exceed 100 minutes, although an extremely tacky adhesive may be satisfactory if its shear time is as low as 50 minutes.

Polyken Probe Tack

The end of a stainless steel rod, having a diameter of 1/16 inch, is forced against the surface of the adhesive at a rate of ½ cm/sec. and a pressure of 100 grams/cm$^2$. After a dwell time of one second, the force required to remove the rod at the rate of ½ cm/sec. is measured. The tack of the adhesive is directly related to the force in grams.

Water-Dispersibility

The material to be tested is converted to liquid form (if such is not its natural state) by dissolving it in an appropriate organic solvent or by heating it to impart fluidity. A layer of the material is then coated on one surface of 40-lb. super-calendered kraft paper and any solvent removed by oven drying to leave a coating on the order of 1–2 mils thick. A few drops of water are then sprinkled on the surface and the thus-moistened surface rubbed with a finger. A water-dispersible material will first become slippery and then begin to dissolve. The procedure outlined in the subsequently described repulpability test may also be followed.

Repulpability

An 8-inch × 1-inch strip of double-coated splicing tape is sandwiched between two 8-inch × 1-inch strips of blotter paper* and cut into 1/2-inch squares. To these squares, sufficient blotter paper, cut into ½-inch squares, is added to make a total of 15 grams, after which all the squares are placed in a Waring Blendor with 500 ml of water. The blendor is run for 30 seconds, and the stock which has splattered up the sides and on the cover is then washed back into the mixer with a wash bottle. The blendor is again run for 30 seconds and washed as before, after which it is run for a final 30 seconds. The stock is then removed from the blendor, rinsed twice with water, and made into a hand sheet using a large sheet mold. The sheet is couched off the mold, pressed between blotters for 1½ minutes in a hydraulic press, removed, dried, and examined for any particles of unrepulped splicing tape. If any such particles are present, the tape is considered unsatisfactory. Further deails are found in TAPPI Test RC—282.

* For tape having adhesive on only one side, two 8-inch × 1-inch strips are adhered to blotter paper.

The foregoing test does not apply to tape products where, e.g., the backing is a biaxially oriented polyester film, which does not lend itself to repulping. Such backings are strong, however, and may be used in splicing tape provided the loosened backing is removed from the beater.

DESCRIPTION OF PRESENTLY PREFERRED EMBODIMENTS

It is believed that understanding of the invention will be facilitated by consideration of illustrative but non-limitative examples. In each case, an acrylate:vinyl carboxylic acid copolymer was prepared, generally as described in Ulrich U.S. Pat. No. 2,884,126. The monomers to be copolymerized were dissolved in acetone (occasionally including up to 20% methanol or 10% water) and, using azobisisobutyronitrile as a catalyst, the solution held at 53°C. for 24 hours, by which time polymerization was largely completed. To the resultant viscous solution was then added a small amount of water and an amount of alkanolamine calculated to be sufficient to neutralize the desired amount of acid function, i.e., at least sufficient to impart water-dispersibility to the ultimate adhesive formulation. The resultant solution was then either coated directly on a 40-lb. supercalendered kraft paper backing or first modified by blending therewith a water-dispersible plasticizer or tackifier in liquid form and thereafter coated. Plasticizers which are water-soluble polyoxyalkylene compounds are themselves oily liquids and thus were added directly, without modification. Where, however, the tackifier employed was a water-dispersible rosin, it was prepared by dissolving water-insoluble acid rosin in isopropyl alcohol and reacting it with sufficient alkanolamine to achieve water-dispersibility. The exact amount of alkanolamine required to attain water-dispersibility is related to the specific rosin, but 65% to 90% neutralization of the acid function it typical. In any event, the adhesive coating was then dried in a 150°–175°F. calculating air oven for about 5 minutes.

For convenience, the following examples are presented in tabular form, all prepared substantially in accordance with the procedure just discussed. All parts and percentages are by weight unless otherwise noted. In each case, the adhesive was water-dispesible and splices formed therewith were repulpable. The following abbreviations have been employed:

Acrylate monomers
DDA — dodecyl acrylate
EA — ethyl acrylate
IOA — iso-octyl acrylate (mixed ester reaction product of acrylic acid and the isomers of octyl alcohol
nBA — n-butyl acrylate Acrylic acid monomers
AA — acrylic acid
IA — itaconic acid
MAA — methacrylic acid Alkanolamine
AMPD — 2-amino-2-methyl-1,3-propane diol
DEA — diethanolamine
DME 180 — dimethylamine poloxyethylene, molecular weight 180
DMEA — dimethyl ethanolamine
DMP 160 — dimethylamine polyoxypropylene, molecular weight 160
DMP 400 — do. 400
MTEA⁺OH⁻ — methyl tricthanol ammonium hydroxide
MDEA — methyl diethanolamine
QUAD — N,N,N',N'-tetra-3-hydroxypropylethylenediamine
TEA — triethanolamine
THAM — Tris hydroxymethylaminomethane
TIPA — triisopropanol amine Rosin tackifiers
GR — gum rosin
GRM — maleated gum rosin
TOR — tall oil rosin
TORD — disproportionated tall oil rosin
TORP — polymerized tall oil rosin
WRD — disproportionated wood rosin
WRH — hydrogenated wood rosin Polyoxyalkylene plasticizers
NPEO — polyoxyethylene adduct of nonyl phenol, containing 61% ethylene oxide
PPG — polyoxypropylene glycol, average molecular weight 660
PPEG — polyethylene glycol monophenyl ether, average molecular weight 270

TABLE 1

| | Copolymer | | | | | | Tackifier | | | Adhesive Performance | | | | |
|---|---|---|---|---|---|---|---|---|---|---|---|---|---|---|
| | Acrylate monomer | | Acid monomer | | Percent acid neutralized | Alkanol-amine | Wt. percent which is COOH groups subsequently neutralized | Parts per 100 parts copolymer | Type | Alkanol-amine neutralizer | Percent acid function neutralized | Tack, rolling ball, inches | Shear adhesion, min. | Tack polyker probe, grams |
| Example | Type | Parts | Type | Parts | | | | | | | | | | |
| 1 | EA | 90 | AA | 10 | 100 | DMP 400 | 6.25 | 100 | WRH | DMP | 98 | 4.5 | | |
| 2 | nBA | 90 | AA | 10 | 100 | DMP 400 | 6.25 | | | | | 3.0 | 1,277 | |
| 3 | nBA | 90 | AA | 10 | 100 | DMP 160 | 6.25 | 25 | NPEO | | | 1.2 | 32 | |
| 4 | nBA | 90 | AA | 10 | 100 | DMP 160 | 6.25 | 25 | WRH | MDEA | 98 | 1.8 | 143 | |
| 5 | nBA | 75 | AA | 25 | 25 | DMP 400 | 3.88 | 50 | NPEO | | | 11 | 4,388 | |
| 6 | nBA | 75 | AA | 25 | 25 | DMP 400 | 3.88 | {25 NPEO, 50 WRH} | | MDEA | 98 | 6.7 | 718 | |
| 7 | nBA | 75 | AA | 25 | 25 | DMP 400 | 3.88 | 100 | WRH | MDEA | 98 | 10.7 | 495 | |
| 8 | nBA | 75 | AA | 25 | 25 | DMP 400 | 3.88 | 100 | WRH | DMP | 98 | 8.2 | 298 | |
| 9 | nBA | 50 | AA | 50 | 15 | DMP 400 | 4.08 | 150 | NPEO | | | 7.6 | | |
| 10 | IOA | 75 | AA | 25 | 80 | DMP 400 | 12.5 | 50 | WRH | MDEA | 98 | 1.1 | 54 | |
| 11 | IOA | 75 | AA | 25 | 80 | DMP 400 | 12.5 | 25 | WRH | MDEA | 98 | 5.0 | 172 | |
| 12 | IOA | 75 | AA | 25 | 80 | AMPD | 12.5 | 200 | WRH | MDEA | 98 | 10.5 | | |
| 13 | IOA | 75 | AA | 25 | 100 | DMP 160 | 15.6 | 100 | NPEO | | | 6.4 | 56 | |
| 14 | IOA | 75 | AA | 25 | 100 | MDEA | 15.6 | {80 WRH, 40 NPEO} | | MDEA | 98 | 1.0 | 110 | |
| 15 | IOA | 50 | AA | 50 | 20 | DMP 400 | 6.25 | 150 | NPEO | | | 5.6 | | |
| 16 | IOA | 50 | AA | 50 | 20 | DMP 400 | 6.25 | 150 | PPG | | | 7.2 | | |
| 17 | DDA | 50 | AA | 50 | 25 | DMP 400 | 7.82 | 200 | WRH | MDEA | 98 | 6 | 4,625 | |
| 18 | DDA | 50 | AA | 50 | 25 | DMP 400 | 7.82 | 300 | WRH | MDEA | 98 | 10 | 690 | |
| 19 | DDA | 50 | AA | 50 | 25 | DMP 400 | 7.82 | 400 | WRH | MDEA | 98 | 17 | 710 | |
| 20 | IOA | 75 | AA | 25 | 100 | MDEA | 15.6 | 150 | TORD | MDEA | 98 | 2.2 | | 70 |
| 21 | IOA | 75 | AA | 25 | 100 | MDEA | 15.6 | 150 | TOR | MDEA | 98 | 4.7 | | 55 |
| 22 | IOA | 75 | AA | 25 | 100 | MDEA | 15.6 | 150 | WRH | MDEA | 98 | 1.2 | | 40 |
| 23 | IOA | 75 | AA | 25 | 100 | MDEA | 15.6 | 150 | WRD | MDEA | 98 | 5 | | 110 |
| 24 | IOA | 75 | AA | 25 | 100 | MDEA | 15.6 | 150 | GR | MDEA | 98 | 5.7 | | 110 |
| 25 | IOA | 75 | AA | 25 | 100 | MDEA | 15.6 | 150 | GRM | MDEA | 98 | 9.2 | | 60 |
| 26 | IOA | 75 | AA | 25 | 100 | MDEA | 15.6 | 150 | TORP | MDEA | 98 | 18 | | 182 |
| 27 | DDA | 20 | AA | 80 | 20 | DMP 400 | 10.0 | 200 | WRH | DMP 160 | 98 | 8.0 | | |
| 28* | DDA | 65 | AA | 35 | 100 | DMP 400 | 21.9 | 50 | PPEG | | | 6.0 | | |
| 29 | nBA | 75 | IA | 25 | 50 | DMP 400 | 8.68 | 75 | NPEO | | | 2.7 | | |
| 30 | nBA | 90 | IA | 10 | 100 | DMP 400 | 6.93 | | | | | 2.3 | | |
| 31 | DDA | 50 | AA | 50 | 100 | DMP 400 | 8.85 | | | | | 4.0 | | |
| 32 | DDA | 80 | MAA | 20 | 100 | MDEA | 10.5 | 25 | WRH | MDEA | 98 | 3.5 | | |
| 33 | nBA | 80 | MAA | 20 | 100 | TEA | 10.5 | | | | | 12 | | |
| 34 | nBA | 80 | MAA | 20 | 100 | DME 180 | 10.5 | | | | | 2.7 | | |

*The neutralized copolymer has only marginal water solubility.

The following table qualitatively indicates the comparative effectiveness of various alkanolamines in rendering a 75:25 IOA:AA copolymer water-soluble and simultaneously imparting some degree of tack:

TABLE II

| Alkanolamine | | Degree of Tack imparted | Degree of water-solubility imparted |
|---|---|---|---|
| AMPD | (Primary) | None | Good |
| DEA | (Secondary) | Good | do. |
| TEA | (Tertiary) | do. | do. |
| DMEA | do. | Fair | Fair to poor |
| MDEA | do. | Good | Excellent |
| TIPA | do. | do. | do. |
| QUAD | do. | do. | do. |

The following table qualtitatively indicates the comparative effectiveness of various alkanolamines in imparting tack and water-solubility to the same hydrogenated wood rosin:

TABLE III

| Alkanolamine | | Degree of Tack imparted | Degree of water-solubility imparted |
|---|---|---|---|
| AMPD | (Primary) | None | Fair |
| THAM | do. | None | Good |
| EA | do. | Fair | Fair |
| DEA | (Secondary) | Good | Good |
| TEA | (Tertiary) | Excellent | Excellent |
| DMEA | do. | Good | Fair |
| MDEA | do. | Excellent | Excellent |
| 50% MTEA$^+$OH$^-$ | | none | Excellent |

In the interest of simplicity, each of the copolymers listed in the examples employs a single acrylate monomer and a single acid monomer. The acrylate copolymer can, however, be obtained by copolymerizing a plurality of acrylates and/or vinyl carboxylic acids; it will also be apparent from the examples that more than one plasticizer, tackifier or both can be included. Likewise, although it is perhaps simplest to react both the acrylate copolymer and any acidic tackifier with sufficient alkanolamine to render each per se water-dispersible, one can be neutralized to somewhat less than a water-dispersible state if the other is neutralized somewhat beyond its threshold of water-dispersibility; the subsequent claims are to be construed to include these and similar obviously equivalent modifications. It might also be noted that the acrylate copolymers need not be neutralized to the point where they are water-dispersible per se, provided that a readily water-soluble plasticizer (such as one based on polyethylene or polypropylene oxide) is employed. It is generally undesirable to use more alkanolamine than is required to completely neutralize the acid function of a rosin, since the excess tends to oxidize and take on an unattractive brown color.

The man skilled in the art will recognize that it is not feasible to set forth all the variations to which this invention is susceptible, and many modifications will readily suggest themselves, especially if certain principles are borne in mind. For example, the shorter the chain length of the alcohol from which the acrylate monomer is derived, the firmer the resultant pressure-sensitive adhesive. If a softer adhesive is desired, the chain length of the alcohol may be increased; alternatively, the acrylic acid portion of the copolymer can be reacted with a relatively long chain alkanolamine. If greater shear strength for an adhesive made with a given copolymer is desired, a higher molecular weight, as evidenced by a higher intrinsic viscosity, can be used; alternatively, a small amount of a known cross-linking agent can be incorporated.

It will likewise be recognized that, to achieve specific results, it may be desirable to incorporate minor amounts of monomeric modifiers into copolymers used to formulate adhesives of the invention; for example, styrene or methyl methacyrlate, increases firmness, tert-butyl styrene increases tack and vinyl acetate improves adhesion to plastics, e.g., biaxially oriented polyethylene terphthalate. Similarly, dyes pigments, fillers, etc. may be added where necessary or desirable.

Although this information has been particularly described with respect to a splicing tape for papermaking and printing operations, the pressure-sensitive adhesive has many other uses. For example, water-soluble adhesive labels may be applied to dishes, windows, or other surfaces which it is common to clean with aqeous solvent. Cloth labels coated with this adhesive may readily be washed from garments to which they are affixed. Likewise, since the adhesive is substantially insoluble in most oils or similar hydrocarbon solvent, it may be employed in applications where conventional normally tacky and pressure-sensitive adhesive tapes prove unsatisfactory.

What is claimed is as follows:

1. Normally tacky and pressure-sensitive water-dispersible adhesive comprising:
   a. a copolymer of monomers consisting essentially of
      1. about 90–20 parts by weight monomeric acrylic acid ester of non-tertiary alkyl alcohol the molecules of which have 1 to 4 carbon atoms; and
      2. about 10–80 parts by weight vinyl carboxylic acid monomer copolymerizable with said acrylic acid ester, at least a number of the carboxyl groups in said acid monomers sufficient to constitute about 3–22% the weight of said copolymer, having been neutralized by reaction with a secondary or tertiary alkanolamine containing at least 4 carbon atoms; and
   b. 0–400 parts by weight, sufficient to render said adhesive water-dispersible and to impart thereto a rolling ball tack value of no more than 20 inches, of at least one water-dispersible tack-promoting material selected from the class consisting of the oily plasticizing water-soluble polyoxyethylene compounds and the tackifying reaction products of acid rosins and alkanolamines.

2. The adhesive of claim 1 wherein the non-tertiary alcohol molecules from which the acrylic acid ester was derived contain an average of 4–12 carbon atoms, at least a major portion of said molecules having a carbon-to-carbon chain of at least 4 carbon atoms terminating at the hydroxyl carbon atoms, said chain containing at least one-half the total number of carbon atoms in the molecule, said acrylic acid ester being further characterized as per se polymerizable to a sticky, stretchy, and elastic polymer mass.

3. Normally tacky and pressure-sensitive adhesive sheet material comprising a self-sustaining sheet backing having coated over at least one face thereof the adhesive of claim 1.

4. Normally tacky and pressure-sensitive adhesive tape according to claim 3 wherein the alkyl alcohol consists essentially of iso-octyl alcohol and the carboxylic acid monomer consists essentially of acrylic acid.

5. The tape of claim 4 wherein the backing is a water-dispersible paper so as to provide a totally repulpable splicing tape having particular utility in the papermaking and printing industries.

6. The tape of claim 5 wherein the water-dispersible copolymer consists essentially of 75 to 50 weight percent iso-octyl acrylate and carboxylic acid monomer correspondingly consists essentially of 25 to 50 weight percent acrylic acid.

7. The tape of claim 6 wherein the tack-promoting material is a rosin which has been reacted with a sufficient amount of secondary or tertiary alkanolamine to be rendered water-dispersible.

8. The tape of claim 7 wherein the alkanolamine is tertiary.

9. The tape of claim 8 wherein about 100 parts by weight of the tackifier are employed.

10. The tape of claim 9 wherein the rosin has been reacted with methyldiethanolamine.

11. The tape of claim 3 wherein the copolymer consists essentially of 75:25 n-butyl acrylate:acrylic acid, about 25% of the acid function being neutralized.

12. The tape of claim 3 wherein the copolymer consists essentially of n-butyl acrylate and acrylic acid, essentially all of said acrylic acid being neutralized with a polyoxypropylene adduct of dimethyl amine.

13. The tape of claim 12 wherein the weight ratio of acrylate:acrylic acid is about 90:10.

14. The method of preparing a normally tacky and pressure-sensitive water-dispersible adhesive which comprises blending with a rubbery polymer an effective amount of the water-dispersible reaction product of an acidic rosin and a secondary or tertiary alkanolamine.

* * * * *